United States Patent [19]

Lee

[11] Patent Number: 5,060,220
[45] Date of Patent: Oct. 22, 1991

[54] PROTECTION CIRCUIT FOR OPTICAL DISC PLAYERS

[75] Inventor: Rae Hwan Lee, Suwon, Rep. of Korea

[73] Assignee: SamSung Electronics Co., Ltd., Suwon, Rep. of Korea

[21] Appl. No.: 375,479

[22] Filed: Jul. 5, 1989

[30] Foreign Application Priority Data

Jul. 5, 1989 [KR] Rep. of Korea ............... 1988-10968

[51] Int. Cl.$^5$ ............................................. G11B 7/00
[52] U.S. Cl. ...................................... 369/58; 369/54; 369/79; 369/233; 369/116
[58] Field of Search .................... 369/19, 99, 116, 292, 369/233, 79, 54, 53, 58; 346/76 L, 135.1

[56] References Cited

U.S. PATENT DOCUMENTS 4,032,971  6/1977  Camerik .......................... 369/111 X
4,499,571  2/1985  Yokota .................................. 369/54

Primary Examiner—Robert L. Richardson
Attorney, Agent, or Firm—Robert E. Bushnell

[57] ABSTRACT

A protection circuit for optical disc players which can prevent the unnecessary radiation of laser beams due to a malfunction of the player. The circuit includes a laser radiating and detecting device which detects the laser beams reflecting from an optical disc and a driving stage which receives the detected signal from the laser radiating and detecting device and controls a microcomputer to cut out the supply of a driving voltage to the laser radiating and detecting device when the optical disc is not placed on a disc table.

16 Claims, 1 Drawing Sheet

PROTECTION CIRCUIT FOR OPTICAL DISC PLAYERS

BACKGROUND OF THE INVENTION

1. Field of the Invention

The present invention relates to a protection circuit for optical disc players, and more particularly to a protection circuit which can prevent the unnecessary radiation of laser beams due to a malfunction of the optical disc player.

2. Description of the Prior Art

In the conventional optical disc players, the radiation of laser beams is prevented only when an door of the set is open, the condition of which is detected by means of a eject switch. Practically, the eject switch is turned on when the door is closed. However, the eject switch may be turned on due to a mechanical shock or deformation thereof even when the door of the set is open, causing the laser beams to be radiated by turning on a start switch. This may cause injury to the human body. Further, the laser beams may also be radiated due to a malfunction even when the disc is not safely placed on a disc table.

SUMMARY OF THE INVENTION

It is an object of the present invention to provide a protection circuit for optical disc players which can prevent the radiation of laser beams even when a start switch is turned on so far as the disc is not placed on a disc table of a laser disc player.

In accordance with the present invention, there is provided a protection circuit for optical disc players including a switching stage supplying switching signals for eject and playback modes; a microcomputer control for controlling the supply of a driving voltage for the radiation of laser beams in response to switching signals from said switching stage; a radiation intensity control driven by said driving voltage from said microcomputer control an providing a control voltage for regular intensity of laser radiation; a laser radiating and detecting device for radiating the laser beams in dependence upon said control voltage from the radiation intensity control and detecting said laser beams reflected from an optical disc, said laser radiating and detecting device providing a detected signal the level of which corresponds to the radiation intensity of said reflected laser beams; an amplifier for amplifying said detected signal from said laser radiating and a detecting device with a predetermined voltage gain; and a driving stage receiving the output of the amplifier and providing a start signal to the microcomputer control so that said microcomputer control means controls the supply of said driving voltage to said radiation intensity control means.

BRIEF DESCRIPTION OF THE DRAWING

The present invention will now be described by way of illustrative examples with reference to the accompanying drawing, in which.

DETAILED DESCRIPTION OF THE PREFERRED EMBODIMENT

Figure 1:
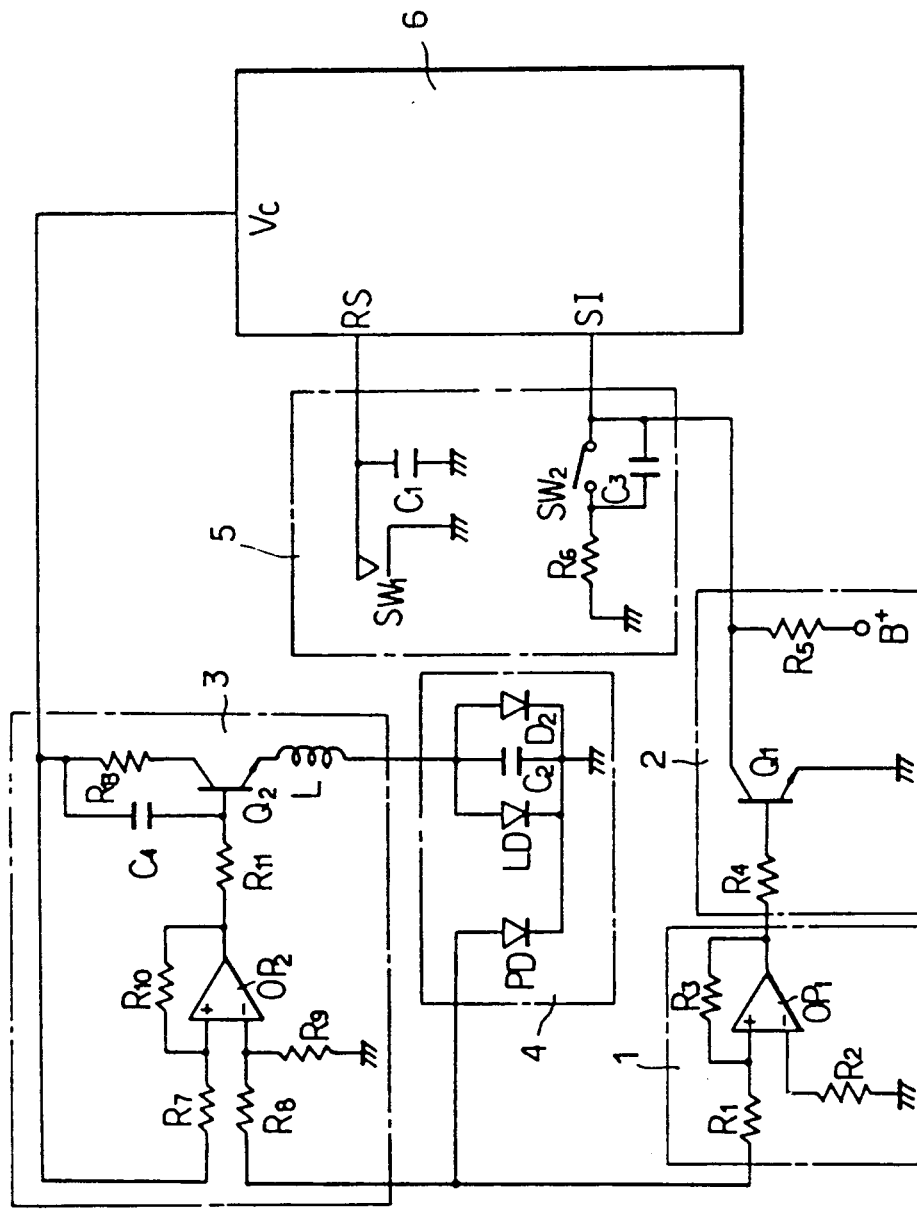
FIG. 1 is a circuit diagram of the embodiment of the present invention.

Referring to FIG. 1, a switching section 5 includes an eject switch SW1 and a start switch SW2 which supply switching signals to a microcomputer 6 respectively. The switching section 5 also includes capacitors C1 and C3 for preventing the chattering of the switches SW1 and SW2 and a resistor R6.

An amplifier 1 includes an operational amplifier OP1. A detected signal RV output from a laser radiating and detecting section 4 is applied to the non-inverting terminal (+) of the operational amplifier OP1 through the resistors R1 and R3 which determine the gain of the operational amplifier OP1. To the inverting terminal (−) of the operational amplifier OP1, an offset resistor R2 is connected.

A driving section 2 has a switching transistor Q1 and bias resistors R4 and R5. The collector of this transistor Q1 is connected to the power supply B+ through the resistor R5 and the start terminal SI of the microcomputer 6. The detected signal RV amplified by the amplifier 1 is applied to the base of the transistor Q1 through the resistor R4.

When the door of the set is closed in a condition that a laser disc has not been placed on a disc table, the eject switch SW1 is turned on and an eject switching signal is applied to the reset terminal RS of the microcomputer 6.

In this state, if the start switch SW2, which is a touch type switch, is turned on, a negative pulse is applied to the start terminal SI of the microcomputer 6, causing the microcomputer 6 to supply a driving voltage Vc of "HIGH" level to a radiation intensity control section 3. Accordingly, the output voltage of a differential amplifying circuit composed of an operational amplifier OP2 and resistors R7 through R10 is applied through a resistor R11 to the base of a transistor Q2, to drive transistor Q2 into saturation. Thus, a control voltage output from the transistor Q2 is applied to a laser diode LD in a laser radiating and detecting section 4, and laser beams are radiated from the laser diode LD. An induction coil L protects the laser diode from being damaged. At this moment, the laser disc is not present on the disc table, as described above, and thus no laser beam is reflected. Therefore, a photodetector PD can not receive any laser beam and produces the detected signal RV of ground level. Because the detected signal RV of ground level is applied to the amplifier 1, the output level thereof also becomes low, causing the transistor Q1 in the driving section 2 to be turned off.

As a result, a start signal of high level, being the voltage level of the power supply B+, is applied from the driving section 2 to the start terminal SI of the microcomputer 6, and consequently the microcomputer 6 cuts out the supply of the driving voltage Vc to the radiation intensity control section 3, resulting in that the radiation of laser beams is stopped. Practically, if the start terminal SI of the microcomputer 6 is not maintained in low level by a predetermined period after the negative pulse produced by the start switch SW2 is input, the microcomputer 6 will determine as the disc is not placed on the disc table, and accordingly will cut out the supply of the driving voltage Vc.

On the other hand, if the start switch SW2 is turned on after the eject switch SW1 is turned on by closing the door of the set in a condition that the disc is present on the disc table, the laser diode LD of the laser radiating and detecting section 4 radiates the laser beams by the same operation as described above. Thus, the photodetector PD can detect the laser beams reflected by the disc and produce the detected signal voltage RV.

This voltage is applied not only to the radiation intensity control section 3 as a feedback signal but also to the non-inverting terminal (+) of the operational amplifier OP1 through the resistors R1 and R3 in the amplifier 1. The output voltage of the operational amplifier OP1 is then applied to the base of the transistor Q1 through the bias resistor R4 in the driving section 2, causing the transistor Q1 to be saturated. Hence, the collector of the transistor Q1, which is connected to the start terminal SI of the microcomputer 6, is connected to ground, and accordingly the microcomputer 6 determines that a disc is present on the disc table and supplies the driving voltage Vc to the radiation intensity control section 3, causing the laser diode LD to radiate the laser beams.

From the foregoing, it will be apparent that the present invention provides a novel protection circuit for optical disc players which can prevent the unnecessary radiation of laser beams even when eject and start switches are turned on so far as the optical disc is not present on the disc table, and accordingly, by the invention the human body can be protected from injury.

What is claimed is:

1. A protection circuit for optical disc players, comprising:
    switching means for supplying switching signals for eject and playback modes;
    microcomputer means for supplying a driving voltage for radiation of laser beams in response to said switching signals from said switching means;
    radiation intensity control means driven by said driving voltage from said microcomputer means, for providing a control voltage for controlling laser beam radiation intensity;
    laser beam radiating and detecting means for radiating said laser beams in dependence upon said control voltage from said radiation intensity control means and for detecting radiation intensity of laser beams reflected from an optical disc, said laser beam radiating and detecting means providing a detection signal having a level corresponding to the radiation intensity of said reflected laser beams;
    means for amplifying said detection signal with a predetermined voltage gain and outputting an amplified detection signal; and
    driving means receiving the amplified detection signal output from said means for amplifying, for providing a start signal to said microcomputer means so that said microcomputer means controls the supply of said driving voltage provided to said radiation intensity control means.

2. The protection circuit of claim 1, further comprised of:
    said laser beam radiating and detecting means providing said detection signal having a first voltage level indicating absence of the optical disc within the player and a second voltage level indicating presence of the optical disc within the player; and
    said driving means providing said start signal with a high voltage level to said microcomputer means in response to said detection signal having said first voltage level and providing said start signal with a low voltage level to said microcomputer means in response to said detection signal having said second voltage level.

3. The protection circuit of claim 2, wherein said microcomputer means supplies said driving voltage to said radiation intensity control means in response to said start signal with a low voltage level and interrupts supply of said driving voltage to said radiation intensity control means in response to said start signal with a high voltage level.

4. The protection circuit of claim 1, wherein said microcomputer means supplies said driving voltage to said radiation intensity control means when said start signal from said driving means has a low voltage level; and
    wherein said microcomputer means interrupts the supply of said driving voltage to said radiation intensity control means when said start signal from said driving means has a high voltage level.

5. The protection circuit of claim 1, wherein said microcomputer control means is responsive to said switching signal for said playback mode for supplying said driving voltage to said radiation intensity control means and prevents the supplying of said driving voltage to said radiation intensity control means when said start signal does not maintain a low voltage level for a predetermined time.

6. The protection circuit of claim 3, wherein said microcomputer control means is responsive to said switching signal for said playback mode for supplying said driving voltage to said radiation intensity control means and prevents the supplying of said driving voltage to said radiation intensity control means when said start signal does not maintain said low voltage level for a predetermined time.

7. A protection circuit, comprising:
    first control means for receiving two different operational mode signals from an optical disc player, for receiving an optical disc detection signal, for responding to one of the mode signals by providing a driving voltage, for responding to a first condition of said detection signal by terminating said driving voltage, and for responding to a second condition of said detection signal by continuing said driving voltage;
    second control means for providing a control voltage to power emission of a laser beam in response to reception of said driving voltage; and
    detection means for utilizing said control voltage to radiate a laser beam, and for changing said detection signal between said first and second conditions in dependence upon reflection of said laser beam from an optical disc within the player.

8. The protection circuit of claim 7, further comprised of:
    said first control means for responding, after expiration of an interval of time, to the absence of said second condition of said detection signal by terminating said driving voltage.

9. The protection circuit of claim 7, further comprised of:
    said detection means being coupled to apply said detection signal to both said first control means and to said second control means.

10. The protection circuit of claim 8, further comprised of:
    said detection means being coupled to apply said detection signal to both said first control means and to said second control means.

11. The protection circuit of claim 7, wherein said first control means is comprised of:
    drive means coupled to receive said detection signal, for generating an interrupt signal in response to said first condition of said detection signal, and for generating a continue signal during said second condition of said detection signal; and processor means coupled between said drive means and said second control means, for generating said driving signal dependent upon one of said mode signals, for continuing generation of said driving signal dependent upon said continue signal, and for terminating generating of said driving voltage in response to said interrupt signal.

12. The protection circuit of claim 8, wherein said first control means is comprised of:

drive means coupled to receive said detection signal, for generating an interrupt signal in response to said first condition of said detection signal, and for generating a continue signal during said second condition of said detection signal; and processor means coupled between said drive means and said second control means, for generating said driving signal in dependence upon one of said mode signals, for continuing generation of said driving signal in dependence upon said continue signal, and for terminating generating of said driving voltage in response to said interrupt signal.

13. The protection circuit of claim 9, wherein said first control means is comprised of:

drive means coupled to receive said detection signal, for generating an interrupt signal in response to said first condition of said detection signal, and for generating a continue signal during said second condition of said detection signal; and processor means coupled between said drive means and said second control means, for generating said driving signal dependent upon one of said mode signals, for continuing generation of said driving signal dependent upon said continue signal, and for terminating generating of said driving voltage in response to said interrupt signal.

14. The protection circuit of claim 10, wherein said first control means is comprised of:

drive means coupled to receive said detection signal, for generating an interrupt signal in response to said first condition of said detection signal, and for generating a continue signal during said second condition of said detection signal; and processor means coupled between said drive means and said second control means, for generating said driving signal in dependence upon one of said mode signals, for continuing generation of said driving signal in dependence upon said continue signal, and for terminating generating of said driving voltage in response to said interrupt signal.

15. A process for preventing unnecessary radiation of a laser beam by an optical disc player, comprising:

applying a play back mode signal to a control circuit of an optical disc player;

responding to said play back mode signal by generating a control voltage having an amplitude for causing emission of laser radiation of regular intensity;

providing a detection signal having a first condition in response to reflection of said laser radiation by an optical disc and a second condition in response to an absence of said reflection of said laser radiation;

continuing generating of said control voltage during said first condition of said detection signal; and interrupting generation of said control voltage during said second condition of said detection signal.

16. The process of claim 15, further comprised of responding, after expiration of an interval of time, subsequent to application of said play back mode signal, to the absence of said first condition of said detection signal by interrupting generation of said control voltage.

* * * * *

UNITED STATES PATENT AND TRADEMARK OFFICE
CERTIFICATE OF CORRECTION

PATENT NO. :  5,060,220
DATED :  22 October 1991
INVENTOR(S) :  Rae Hwan LEE It is certified that error appears in the above-identified patent and that said Letters Patent is hereby corrected as shown below:

Column 1,   Line 14,   change "an" to --a--;

Line 16,   change "a" to --an--;

Line 40,   change "an" to --and--.

Signed and Sealed this

Ninth Day of March, 1993

*Attest:*

STEPHEN G. KUNIN

*Attesting Officer*   *Acting Commissioner of Patents and Trademarks*